US005163999A

United States Patent [19]

Uchida et al.

[11] Patent Number: 5,163,999

[45] Date of Patent: Nov. 17, 1992

[54] DAMPENING SOLUTION COMPOSITION FOR LITHOGRAPHIC PRINTING

[75] Inventors: Toshio Uchida; Hiroshi Matsumoto; Kenji Kunichika; Shigeru Sasaki, all of Shizuoka, Japan

[73] Assignee: Fuji Photo Film Co., Ltd., Ashigara, Japan

[21] Appl. No.: 577,129

[22] Filed: Sep. 4, 1990

[30] Foreign Application Priority Data

May 9, 1989 [JP] Japan ................................ 1-230204

[51] Int. Cl.[5] .......................... C09D 5/02; B41M 1/00

[52] U.S. Cl. ........................................ 106/2; 101/451

[58] Field of Search ............................ 101/451; 106/2; 101/451

[56] References Cited

U.S. PATENT DOCUMENTS

| | | | |
|---|---|---|---|
| 3,354,824 | 11/1967 | Griffith et al. | 106/2 |
| 3,398,002 | 8/1968 | Bondurant | 106/2 |
| 3,829,319 | 8/1974 | Suzuki et al. | 106/2 |
| 3,877,372 | 4/1975 | Leeds | 101/451 |
| 4,030,417 | 6/1977 | Lipovac | 101/451 |
| 4,150,996 | 4/1979 | Druker et al. | 101/451 |
| 4,214,531 | 7/1980 | Garrett et al. | 101/451 |
| 4,285,276 | 8/1981 | Fromson et al. | 101/451 |
| 4,589,920 | 5/1986 | Kanada et al. | 106/26 |
| 4,604,952 | 8/1986 | Dougherty | 101/451 |
| 4,641,579 | 2/1987 | Bernstein | 101/451 |
| 4,724,764 | 2/1988 | MacPhee et al. | 101/451 |
| 4,864,925 | 9/1989 | Van Kanegan et al. | 101/451 |

FOREIGN PATENT DOCUMENTS

| | | |
|---|---|---|
| 0091601 | 10/1983 | European Pat. Off. . |
| 0251621 | 1/1988 | European Pat. Off. . |
| 90309647 | 11/1990 | European Pat. Off. . |

OTHER PUBLICATIONS

Chemical Abstracts vol. 92, No. 6, p. 77, Sep. 1979.

*Primary Examiner*—Theodore Morris
*Assistant Examiner*—David M. Brunsman
*Attorney, Agent, or Firm*—Burns, Doane, Swecker & Mathis

[57] ABSTRACT

Disclosed is a dampening solution composition for lithographic printing. The solution has a dynamic surface tension ranging from 20 to 50 dyne/cm at 15° C. at most $1\times10^{-1}$ seconds after a new surface of the solution is formed on the surface of a printing plate; a viscosity ranging from 1.05 to 5.0 cSt at 15° C.; and an emulsification ratio when mixed with ink which is higher by 2 to 30% than that of pure water mixed with ink.

13 Claims, No Drawings

DAMPENING SOLUTION COMPOSITION FOR LITHOGRAPHIC PRINTING

FIELD OF THE INVENTION

This invention relates to a dampening solution composition for lithographic printing and more particularly, to a dampening solution composition suitable for use in continuous water-feed type dampening systems.

BACKGROUND OF THE INVENTION

In lithographic printing, printing is conducted using a printing plate having ink receptive image areas and hydrophilic non-image areas. Printing is conducted in such a manner that a dampening solution is applied to the hydrophilic surface of the printing plate. When ink is applied, the solution is retained by the hydrophilic areas, but repelled by the ink-receptive printing areas. It is important that the ink and the dampening solution are fed to the surface of the plate with a good ink-water balance.

When there is too much dampening solution, the ink is excessively emulsified by the solution drying is retarded and offset is caused. When there is too little dampening solution, the ink adheres to the non-image areas and scumming results.

Dampening solutions were initially used to prevent scumming during printing. Printing engineers often prepared the solutions using chromates, optionally together with metaphosphoric acid or gum arabic. With improvements in printing quality and printing workability, various types of water feed systems have been developed. As a results, the requirements of dampening solutions have changed. Dampening solutions are required to not only remove scum, but also provide various often performance characteristics. At the same time, dampening solutions must effectively address environmental concerns.

The dampening system invented by Dahlgren in 1960 was an epochmaking invention. The system was introduced into Japan in about 1965, and for the first time an aqueous solution containing IPA (isopropyl alcohol) was used as a dampening solution. At first, dampening solutions contained about 25% IPA. However, this amount was gradually reduced to 5 to 15% due to printability and environmental problems.

When IPA was included in dampening solutions, it was found that the solutions could be used in the form of a thin film, and that it provided faster processing, an improvement in printing quality, and enhanced automation. Thereafter, various continuous dampening systems were developed in succession by domestic and foreign printing press manufactures.

Most of the subsequently developed continuous dampening systems were not inker feed systems like Dahlgren's system where the dampening solution was fed using inked rollers. Instead, they were plate feed-type dampening systems where the dampening solution was fed using rubber rollers independent of the inked rollers. These subsequently developed dampening systems differed from one another in the type of roller materials, the number of rollers, the construction of rollers, the presence or absence of reverse slip nip, the presence or absence of rider rollers and the presence or absence of delivery rollers between inked rollers and dampening rollers.

The aforementioned dampening systems were designed to be used with IPA. The characteristics of the continuous dampening systems were effectively utilized using IPA. That is, a minimum amount of the dampening solution was uniformly applied, and the dampening solution was quickly stabilized so that rising is rapid providing reduced waste and spoilage.

The use of the dampening solutions containing IPA and the continuous dampening systems were, and are still popular. There are, however, Sleeve and Molton systems. In these systems, the dampening solution can be metered and good prints can be obtained. But, when IPA is used in the dampening solutions, there are certain problems.

The first problem is a environmental one. Handling is restricted by certain labor safety hygiene laws, fire laws and sewage laws in Japan.

There are labor safety hygiene laws (organic solvent poisoning prevention rules), which apply to dampening solutions containing at least 5% of IPA. For example, a local evacuation system must be provided when dampening solutions contain at least 5% of IPA are used.

Furthermore, here are rules which require users to make certain environmental measurements and undergo medical examinations.

Unfortunately, when the concentration of IPA is less than 5%, users have been unable to obtain a satisfactory printing effect. And continuous dampening systems developed for rapid processing have likewise been unsuitable.

In Japan, IPA is designated as a fourth petroleum alcohol and must be handled in the same manner as gasoline. IPA is regulated by certain fire laws when stored and used.

Certain sewage laws require users to provide treatment facilities when the pH of the waste is less than 5, or more than 9, or when the biochemical oxygen demand (BOD) is 600 mg/l or higher. IPA relates to the latter. With IPA waste both the pH and BOD must be controlled.

Another problem associated with the use of IPA, is cost. In perfecting four-color web-offset printing presses equipped with continuous dampening system, there are large amounts of IPA used, and cost is high.

To improve the problems associated with IPA, there is proposed in JP-B-61-55480 (the term "JP-B" as used herein means an "examined Japanese patent publication") that the content of the alcohol is reduced to 10% by weight or below. However, the problems can not be solved by only reducing the content of JPA. That is, the amount of IPA is still too large, because to avoid regulation by the organic solvent poisoning prevention rules the amount of IPA should be not higher than 5% or less by weight.

The problem of unstable concentration due to evaporation of IPA can not be effectively addressed so long as dampening solutions contain IPA. U.S. Pat. No. 3,877,372 addresses the problem of the volatility of volatile alcohols, by using butyl cellosolve rather than volatile alcohols. U.S. Pat. No. 4,278,467 describes a mixture of two or more components. These U.S. Patents describes dampening solutions which contain nonionic compounds and are free from IPA.

JP-A-57-199693 (the term "JP-A" as used herein means an "unexamined published Japanese patent application") describe dampening solutions containing 2-etyl-1,3-hexanediol.

Unfortunately, when dampening solutions containing no volatile alcohols are used on printing presses equipped with continuous dampening systems (e.g., the Dahlgren system) to conduct printing, there are several disadvantages. For example, ink adheres to the surface of metering rollers to cause tinting and a loss of ink-water balance. Furthermore, when printing is conducted over a long period of time, there is a fill in of the dots of printed images. Moreover, the water allowance of the dampening system, i.e., the latitude in the graduation of the dampening solution for giving proper prints, is narrow and conducting the printing operation is difficult.

JP-A-58-176280 describes dampening solutions where certain alcohols and glycol ether esters are used as substitutive additives for IPA, and are used in combination with a water-soluble polymer. However, the problems of tinting caused by the deposition of ink on the metering roller, the fill-in of printed images, and narrow water allowances still remain.

U.S. Pat. No. 4,641,579 describes dampening solutions containing butyl cellosolve and thickening agents. However, cellosolve is a class 2 organic solvent, is harmful to the human body, can penetrate into the skin and poses problems such as nephropathy and neuropathy. Accordingly, it is not preferable to use this type of solution, even at a low concentrations over long periods of time.

JP-A-1-40393 describes a substitute dampening solution for those containing IPA. This solution can be obtained by controlling the dynamic surface tension and viscosity within certain ranges. In dampening units (a system wherein the dampening solution is carried by means of inked rollers of an ink unit, i.e., an "inker-feed dampening system") of printing presses, however, water allowance is narrow. Furthermore, roller stripping (the ink of inked rollers is peeled off) is likely.

As mentioned above, many dampening solutions have been proposed as alternatives for those containing IPA. However, those dampening solutions still have problems associated with them concerning printing performance. Suitable dampening solutions which can be used as substitutes for those containing IPA have yet to be found.

SUMMARY OF THE INVENTION

Accordingly, an object of the present invention is to provide a dampening solution which is completely free of IPA, yet is a suitable alternative for IPA-containing dampening solutions.

Another object of the present invention is to provide a dampening solution which can be used as a substitute for IPA-containing dampening solutions, yet provides a printing effect equal to or better than that of IPA-containing dampening solutions when used on printing presses equipped with continuous dampening systems.

Still another object of the present invention is to provide a dampening solution which is safe when used in connection with the human body, and can be used as substitute for IPA-containing dampening solutions.

Another object of the present invention is to provide a dampening solution which exhibits little evaporation, little change in the solution composition, and can be used as a substituent for IPA-containing dampening solutions.

Still a further object of the present invention is to provide a dampening solution which emits little odor when used and can be used as a substituent for IPA-containing dampening solutions.

Another object of the present invention is to provide a dampening solution which can be obtained at reduced cost, and can be used as a substituent for IPA-containing dampening solutions.

The present inventors have made the analysis of the physical properties of dampening solutions containing isopropyl alcohol to solve the above-mentioned problems. Three important factors relating to IPA-containing dampening solutions were discovered. The present invention was developed based on these findings.

The present invention provides a dampening solution composition for lithographic printing, which comprises water, a thickening agent, a water-soluble organic solvent and a surfactant. At most $1\times10^{-1}$ seconds after a new surface of said composition is formed on the surface of a printing plate, the dynamic surface tension of the composition ranges from 20 to 50 dyne/cm at 15° C., the viscosity of the composition ranges from 1.05 to 5.0 cSt at 15° C., and the emulsification ratio of the dampening solution composition mixed with the ink is higher by 2 to 30% than that of the pure water mixed with ink.

DETAILED DESCRIPTION OF THE INVENTION

According to the present invention, the first factor is the dynamic surface tension of the dampening solution. To impart printability equal to that of IPA-containing dampening solution, it was discovered that the dampening solution should have such liquid physical properties that the dynamic surface tension thereof ranges from 25 to 50 dyne/cm at 15° C. at most $1\times10^{-1}$ seconds after a new surface thereof is formed.

Dynamic surface tension is explained, for example, by R. Defay and G. Pétré, *Surface and colloid Science,* 3, P.28 (1971) (Wiley Interscience) as a definition for surface. Basically, this text explains that when the surface of a solution is suddenly expanded and an inner solution comes out of the interior to the surface, the composition of the newly formed surface is the same as that of the interior of the solution, as long as expansion is very quick. If the expansion rate of the surface is quick relative to the diffusion rate of the solute, the instantaneous newly formed surface is in the zero state regarding elapse of time. A surface tension of zero is referred to as pure dynamic surface tension. With the aging of the surface, the surface tension is lowered. Transient individual values are reflective of intermediate dynamic surface tension. In this way, the dynamic surface tension is gradually lowered from pure dynamic surface tension and reaches an equilibrium value. The final equilibrium value is referred to as the static surface tension.

During the operation of printers, the rollers and plate cylinder are rotated at high speeds (measured in millisecond (1/1000 sec) units). The surface tension in these areas is different from that of the static state.

This is explained in the case of the following phenomenon.

The excellent printing effect of IPA-containing dampening solutions has been due to the fact that the surface tension of the dampening solution is lowered by adding IPA thereby improving wetting. In previous works many dampening solutions have been proposed which contain surfactants as IPA substitutes to lower surface tension. When the surface tension of surfactant-containing dampening solutions is measured, e.g., by Du Noüy's tensiometer, low surface tensions similar to those of IPA-containing dampening solution can be obtained. However, when the dampening solutions are used on printing presses equipped with a dampening system such as Dahlgren system, good prints can not be obtained and various printing problems result. For example, printing ink adheres to metering rollers and chrome rollers to cause severe tinting. In addition, prints suffer from scumming.

When the dynamic surface tension of both the surfactant-containing dampening solution and the IPA-containing dampening solution are measured by NOW-INSTANT WILHELMY DYNAMIC SURFACE TENSION ACCESSORY manufactured by Cahn Company (U.S.A.) to compare the dynamic surface tension of both solutions, it was discovered that there is a great difference in the dynamic surface tension of surfactant-containing dampening solutions and IPA-containing dampening solutions.

The NOW-INSTANT WILHELMY DYNAMIC SURFACE TENSION ACCESSORY manufactured by Cahn Company is an apparatus which can measure dynamic surface tension after the lapse of $1\times10^{-1}$ seconds from the formation of a new surface. As a result of this measurement, it was discovered that the value of the dynamic surface tension of IPA-containing dampening solutions is nearly equal to the value of the static surface tension thereof (the value measured by Noüy's tensiometer), while the dynamic surface tension of surfactant-containing dampening solutions is about 71 dyne/cm which is nearly equal to the surface tension (72.5 dyne/cm) of pure water. Thus, it was discovered that surfactants have little capability for lowering surface tension in this context. The fact that there is little change in the dynamic surface tension of surfactant-containing dampening solution after the lapse of $1\times10^{-1}$ seconds, explains the fact that surfactant-containing dampening solutions do not provide good printing results. It is necessary that surface tension is lowered to a desired value after the lapse of $1\times10^{-1}$ to $1\times10^{-3}$ seconds after the formation of a new surface by the dampening roller. On the other hand, the surface tension is certainly lowered by IPA-containing dampening solutions.

Since the IPA-containing dampening solutions are capable of lowering surface tension while coping with the high-speed revolution of printing presses, the printing plate and the rollers are well wetted and good printing results are obtained. In contrast since surfactant-containing dampening solutions do not effectively lower surface tension on printing presses rotated at high speeds, unsatisfactory printing results are obtained.

It is preferred that dynamic surface tension is lowered to a value ranging from 25 to 50 dyne/cm in the specified time, mainly because tinting is prevented and wetting of the printing plate is improved. When the surface tension of the dampening solution is too large in comparison to that of the ink in the formation of an image while keeping the desired ink-dampening solution balance on the press, a thin film of ink spreads over the surface of the dampening solution. A spreading coefficient can be used as a measure for estimating the spreading of the oil film over the surface of the dampening solution. However, there is a simple method where dampening solutions having various surface tension values are prepared and well-kneaded ink is allowed to drop onto the surfaces of the dampening solutions and the spreading of the oil film is examined. When surface tension values of dampening solutions which do not cause the spreading of the oil film are examined by that method, it will be found that the surface tension is not higher than 50 dyne/cm. The dynamic surface tension of the dampening solution can be lowered by adding organic solvents, but should not be less than 25 dyne/cm, because the dampening solution is an aqueous solution. Good printing effects can be obtained when the surface tension ranges from 25 to 50 dyne/cm.

Examples of water-soluble organic solvents which can be used to lower the dynamic surface tension of the dampening solutions include alcohols, polyhydric alcohols, ethers, polyglycols and esters.

Examples of the alcohols include n-butyl alcohol, n-amyl alcohol, n-hexyl alcohol, 2-methylpentanol-1, secondary hexyl alcohol, 2-ethylbutyl alcohol, secondary hepty alcohol, heptanol-3, 2-ethylhexyl alcohol and benzyl alcohol.

Examples of the polyhydric alcohols include ethylene glycol, hexylene glycol, octylene glycol and diethylene glycol. Examples of the ethers include ethylene glycol monoethyl ether, ethylene glycol mono-n-hexyl ether, ethylene glycol monophenyl ether, ethylene glycol mono-2-ethylbutyl ether, diethylene glycol monoethyl ether and diethylene glycol mono-n-hexyl ether.

Examples of the esters include diethylene glycol monoethyl ether acetate and diethylene glycol monobutyl ether acetate.

Examples of polyglycols include polyethyleneglycols having an average molecular weight of 400 to 2,000, polypropyleneglycols having an average molecular weight of 400 to 2,000, and block copolymers of ethyleneglycol and propyleneglycol.

The water-soluble organic solvents are incorporated in the dampening solutions to depress the dynamic surface tension. However, it is preferred to use as little of the organic solvents as possible. With this goal in mind, it was also discovered that dynamic surface tension can be greatly lowered by the addition of organic solvents having low solubilities in water. As a result, small amounts of such solvents can be effectively used. These type of organic solvents have a solubility of about 0.5 to 80% by weight, preferably 0.5 to 10% by weight, in water at 20° C.

The dampening solutions of the present invention may contain from about 0.5 to 15% by weight of these water-soluble organic solvents.

It is preferred from the viewpoint of safety that the organic solvents of the present invention are water-soluble organic solvents, which are not regulated by the aforementioned organic solvent rules.

In addition, it is preferred that the organic solvents to be used are inert to lithographic ink, because the dampening solution is always contacted with printing ink on the printing press. When pigment, dye and other additives in ink bleed into the dampening solution, problems result during printing over a long period of time. Thus, organic solvents which cause bleeding are not preferred.

More preferred examples of the water-soluble organic solvents for lowering dynamic surface tension are octylene glycol, ethylene glycol diethyl ether, ethylene glycol monophenyl ether and ethylene glycol mono n-hexyl ether.

The second underlying factor relates to the viscosity of the dampening solution. This factor was found to be important when the liquid physical properties of the dampening water were analyzed. When IPA is added to water, the viscosity of water is gradually increased with an increase of addition amount of IPA. When the content of IPA reaches about 50%, the viscosity reaches its peak value. When the content of IPA exceeds about 50%, the viscosity is lowered with an increase in the content of IPA. The thickening phenomenon caused by the addition of IPA to water is thought to be due to the hydrogen bond between water and IPA.

In continuous dampening systems, water is passed through the nip of rollers. One roller of the nip is a chrome roller and the other is rubber roller. A gap of the nip through which water is passed is formed by the recess of the rubber layer.

The characteristics of this part can be discussed in terms that a liquid exists between curved surfaces brought into rolling contact with each other. Since a liquid exists in the nip part, there is a pressure distribution during the passage of the liquid through the nip and the surfaces of the rollers are deformed according to the pressure distribution. By this deformation, the passage of the liquid is changed and pressure distribution is changed. The pressure distribution and the deformation, the passage of the liquid is changed and pressure distribution is changed. The pressure distribution and the deformation of the surfaces of the rollers in the nip part are balanced. This phenomenon is called Elasto Hydrodynamic Lubrication (EHL).

According to EHL theory, the minimum thickness of the dampening water passing through the nip part is a function of the viscosity of the dampening water, an average peripheral speed of the rollers, a relative curvature radius, the linear pressure of the nip, and an equivalent elastic coefficient. Therefore, the thickness of the dampening solution passing through the nip is increased with an increase in the viscosity of the dampening solution. EHL theory supports the conclusion that it is necessary for the dampening solution itself to have a viscosity of at least a given value to ensure that a given amount of a stable water film is formed by the passage of the dampening solution through the nip of the rubber roller and the metallic roller.

IPA-containing dampening water has a viscosity of 1.2 to 3 cSt at 15° C. depending on the content of IPA. Hence the dampening solution as a given amount of a water film, is allowed to be passed through the nip between the rollers and a good printing effect can be obtained. It is commonly said that the viscosity of the dampening solution gives "water-drawing up effect" and "water transition effect".

The viscosity of the dampening water is described in more detail in JP-B-61-55480 and JP-A-58-176280.

Examples of thickening agents which can be used in the present invention include carboxymethyl cellulose, carboxyethyl cellulose, aminoethyl cellulose, ethyl cellulose, methyl cellulose, benzyl cellulose and glyoxal-modified products of these water-soluble cellulose derivatives; and sodium alginate, propylene glycol alginate, tragacanth gum, crystal gum, hydroxyethylated starch, hydroxypropylated starch, starch phosphate, starch acetate, carboxymethylated starch, carboxyethylated starch, cyanoethylated starch, dialdehydostarch, cyclodextrin, branched cyclodextrin, polyvinyl pyrrolidone, vinyl acetate-maleic acid copolymer, vinyl acetatecrotonic acid copolymer, vinyl acetate-acrylic acid copolymer, polyvinyl alcohol-maleic acid copolymer, polyvinyl methyl ether, styrene-maleic acid copolymer, styrene-crotonic acid copolymer, polyacrylic acid, polysodium acrylate, polymethacrylates and water-soluble high-molecular compounds derived from derivatives thereof. These compounds may be used either alone or as a mixture of two or more of them.

The viscosity of the dampening solutions containing these thickening agents is affected by pH, the addition of salts, stirring intensity, temperature, etc., and greatly affected by the molecular weights of the water soluble high-molecular compounds. Accordingly, the concentration of the thickening agent must be adjusted so that the viscosity of the dampening solution is 1.05 to 5.0 cSt at 15° C. The amount of the thickening agent to be added varies depending on the types of the thickening agents, but is preferably about 0.005 to 10% by weight based on the amount of the dampening solution composition.

In the present invention, the third underlying factor is the emulsifiability of the dampening solution in ink. This factor was found to be important when the liquid physical properties of IPA-containing dampening water was analyzed. It was found that when IPA is gradually added to water, the emulsification ratio thereof in ink was gradually increased in the range of the IPA content of 0 to 30% by weight (this range is the concentration range of IPA usually used in lithographic printing).

It was discovered that the emulsification ratio of a dampening solution substitute in a given ink should be higher than that of pure water in the ink to obtain a dampening solution substitute providing printability equal to that of IPA-containing dampening solutions.

It was surprisingly found that a dampening solution having printing performance substantially equal to that of the IPA-containing dampening solutions can not be obtained by optimizing only the above-mentioned first two factors, i.e., dynamic surface tension and viscosity. Emulsifiability must also be considered.

In lithographic printing, emulsification can not be avoided. Basically, ink and water do not mix with each other, but repel each other. Practically, water droplets are incorporated into ink on the plate and rollers to cause emulsification. It is necessary that a certain amount of water is incorporated in ink and a stable emulsified state (water-in-oil type) is formed to conduct normal lithographic printing. The emulsifiability is an important factor which is directly related to the quickness of the setting of printing, the dryness of ink, producibility, printing quality, etc.

In the present invention, emulsification ration is determined by the mortar method. The mortar method is best classified into (i) the excess water introducing method and (ii) a method for introducing successively a small amount of water. Both methods can be used in connection with the present invention. In the first method, the excess water introducing method, a dampening solution and ink are put into a mortar and thoroughly mixed for 5 minutes by means of a pestle. The dampening solution which is not incorporated into ink is allowed to run by slanting the mortar. Slight vibration is applied and unstable free water is removed. This ink emulsifying method is described in more detail in *Ink Reader of Lithographic printer*, PP181-182 (copyright holder: Lithographic Technical Foundation) published by Printing society.

In the second method, the method for introducing successively a small amount of water, a given amount of ink is put into a mortar, 0.5 g of water is added dropwise thereto and the mixture is thoroughly mixed, whereby water is absorbed by ink and water is emulsified and dispersed in the ink. After the completion of water absorption, a further 0.5 g of water is added dropwise thereto and stirring is repeatedly conducted. When water is no longer absorbed and free water is formed, the dropwise addition of water is terminated. In a similar manner to that of the above-described excess water introducing method, water which is not emulsified is allowed to run, slight vibration is applied to the mortar, and unstable free water is removed.

The emulsification ratio in ink is determined from the above-described emulsification methods by calculating the ratio of water incorporated into ink before and after emulsification by a gravimetric method. The emulsification ratio of the preset invention is defined by the percentage obtained by dividing the weight of water incorporated into ink by the weight of ink. Of course, it is necessary that the measurement of the emulsification ratio is made under given environmental conditions (temperature, humidity).

The emulsification ratio in ink varies depending on the types and brands of ink and additives. It is problematic that emulsifiability as a function of IPA is represented by the absolute value of the emulsification ratio. Accordingly, the emulsification ratio of pure water in a given ink is determined and the emulsification ratio of pure water is referred to as standard. When the emulsification ratio of a dampening water to be tested is higher than that of the standard, it can be determined that the emulsification ratio is increased.

According to the invention, the rise of the emulsification ratio is higher by 2 to 30% than the emulsion ratio of pure water, preferably higher than 3 to than the standard.

Any of conventional lithographic inks can be used in the present invention. Examples of the lithographic inks include general process color ink, offset printing ink, multi-color ink, gold and silver ink, UV ink, ink for synthetic paper, fluorescent ink and metallic ink of metal printing.

Generally, surfactants are added to increase the emulsification ratio in ink. Examples of surfactants include anionic surfactants such as salts of fatty acids, salts of abietic acid, hydroxyalkanesulfonates, alkanesulfonates, dialkyl sulfosuccinates, straight-chain alkylbenzenesulfonates, branched alkylbenzenesulfonates, alkylnaphthalenesulfonates, alkylphenoxypolyoxyethylene propylsulfonates, salts of polyoxyethylene alkylsulfophenyl ethers, sodium salt of N-methyl-N-oleyltaurine, disodium salt of N-alkylsulfosuccinic acid monoamides, petroleum sulfonates, sulfonated castor oil, sulfated beef tallow oil, sulfuric ester salts of alkyl esters of fatty acids, sulfuric ester salts of polyoxyethylene alkyl ethers, fatty acid monoglyceride sulfuric ester salts, polyoxyethylene alkylphenyl ether sulfuric ester salts, polyoxyethylene styrylphenyl ether sulfuric ester salts, alkylphosphoric ester salts, polyoxyethylene alkyl ether phosphoric ester salts, polyoxyethylene alkylphenyl ether phosphoric ester salts, partial saponified products of styrene-maleic anhydride copolymer, partial saponified products of olefin-maleic anhydride copolymers and condensates of naphthalenesulfonates with formalin, among which dialkyl sulfosuccinates, alkylsulfates and alkylnaphthalene sulfonates are particularly preferred; nonionic surfactants such as polyoxyethylene alkyl ethers, polyoxyethylene alkylphenyl ethers, polyoxyethylene polystyryl phenyl ether, polyoxyethylene polyoxypropylene alkyl ethers, partial fatty acid esters of glycerin, partial fatty acid esters of sorbitan, partial fatty acid esters of pentaerythritol, monofatty acid esters of propylene glycol, partial fatty acid esters of sucrose, partial fatty acid esters of polyoxyethylene sorbitol, fatty acid esters of polyethylene glycol, partial fatty acid esters of polyglycerol, polyoxyethylenated castor oil, partial fatty acid esters of polyoxyethylene glycerol, fatty acid diethanolamides, N,N-bis-2-hydroxyalkylamines, polyoxyethylene alkylamines, fatty acid esters of triethanolamine and trialkylamine oxides among which polyoxyethylene alkylphenyl ethers and polyoxyethylene-polyoxypropylene block copolymers are preferred; and cationic surfactants such as alkylamine salts quaternary ammonium salts, polyoxyethylene alkylamine salts and polyethylene polyamine derivatives.

The contents of these surfactants should not be higher than 10% by weight, preferred 0.01 to 3% by weight when foaming is taken into consideration.

It is preferred that the dampening solution have a pH of 3 to 6. When the pH is lower than 3, an etching effect on supports is enhanced and plate wear is lowered. Usually, mineral acids, organic acids or inorganic salts are added to adjust the pH to from 3 to 6. The amount of these compounds to be added are preferably 0.001 to 5% by weight.

Examples of the mineral acids include nitric acid, sulfuric acid and phosphoric acid. Examples of organic acids include citric acid, acetic acid, oxalic acid, molonic acid p-toluenesulfonic acid, tartaric acid, malic acid, lactic acid, levulinic acid and organic phosphonic acids. These mineral acids, organic acids or inorganic salts may be used either alone or in a combination of two or more of them.

The dampening solution composition of the present invention can have a pH of 7 to 11 by incorporating an alkali metal hydroxide, an alkali metal salt of phosphoric acid, an alkali metal salt of carbonate or a silicate therein.

If desired, a wetting agent in addition to the above-described components my be added to retard drying and to impart good applicability. Examples of suitable wetting agents include glycerin, ehtylene glycol, propylene glycol, butylene glycol, pentanediol, hexylene glycol, diethylene glycol, triethylene glycol, tetraethylene glycol, sorbitol and pentaerythritol. The amount of the wetting agent is preferably not more than 2.0% by weight.

In addition to the above-described components, chelate compounds may be added to the dampening solution composition of the present invention. Usually, the dampening solution is used by diluting a concentrate thereof with tap water, well water, etc. Calcium ion, etc. contained in tap water, well water, etc. have an adverse effect on printing, whereby prints are liable to be stained. When the chelate compound is added thereto, the above-mentioned problem can be solved. Examples of the chelate compounds include aminopolycarboxylic acids such as ethylenediaminetetraacetic acid and potassium and sodium salts thereof, diethylenetriaminepentaacetic acid and potassium and sodium salts thereof; triethylenetetraminehexaacetic acid and potassium and sodium salts thereof, hydroxyethylethylenediaminetriacetic acid and potassium and sodium salts thereof, nitrilotriacetic acid and potassium and sodium salts thereof, 1,2-diaminocyclohexanetetraacetic acid and potassium and sodium salts thereof and 1,3-diamino-2-propanol-tetraacetic acid and potassium and sodilum salts thereof; organic phosphonic acids and phosphonotricarboxylic acids such as 2-phosphonobutanetricarboxylic acid-1,2-4 and potassium and sodium salts thereof, 2-phosphonobutanetricarboxylic acid-2,3,4 and potassium and sodium salts thereof, 1-phosphonethanetricarboxylic acid-1,2,2 and potassium and sodium salts thereof, 1-hydroxyethane-1,1-diphosphonic acid and potassium and sodium salts thereof and aminotri(methylenephosphonic acid) and potassium and sodium salts thereof. Organic amine salts are also effective in place of the sodium or potassium salts of the above chelate compounds. These chelate compounds are chosen as compounds which stably exist in the dampening solution and do not have an adverse affection printability. The chelates compounds are used in an amount of 0.001 to 3% by weight, preferably 0.01 to 1% by weight based on the amount of the dampening solution.

Coloring materials and antiseptics may be added to the dampening solution of the present invention. For example, benzoic acid or a derivative thereof, phenol, formalin, sodium dehydroacetate, 4-isothiazoline-3-one compound, etc. in an amount of 0.0001 to 1% by weight may be added.

Furthermore, the dampening solution composition of the present invention may contain a corrosion inhibitor such as magnesium nitrate, zinc nitrate, calcium nitrate, sodium nitrate, potassium nitrate, lithium nitrate or ammonium nitrate, a hardening agent such as a chromium compound or an aluminum compound, an organic solvent such as a cyclic ether (e.g., 4-butyrolactone), benzyl alcohol, ethylene glycol monophenyl ether, ethyl alcohol or n-propyl alcohol, a water-soluble surface active organometallic compound described in JP-A-61-193893 or a silicone anti-foaming agent. These additives may be added in an amount of 0.0001 to 1% by weight.

Generally, the dampening solution is concentrated and the concentrate is diluted when used. The dampening solution composition of the present invention is also concentrated and the concentrate can be diluted when used.

The dampening solution composition of the present invention can be used alone or together with IPA, other commercially available each solutions and other additives when used as the dampening solution.

In the interest of brevity and conciseness, the contents of the aforementioned numerous patents and articles are hereby incorporated by reference. The present invention is now illustrated in greater detail by reference to the following examples which, however, are not to be construed as limiting the invention in any way. In the examples, % is by weight unless otherwise indicated.

EXAMPLE 1

| Solution A of the present invention | Parts by weight |
|---|---|
| Pure water | 100.0 |
| Carboxymethyl cellulose (Cellogen, a product of Dai-ichi Kogyo Seiyaku Co., Ltd.) | 0.015 |
| Octylene glycol | 0.85 |
| Anionic surfactant (Rapisol, a product of Nippon Oils & Fats Co., Ltd.) | 0.01 |

The viscosity of the above dampening solution was 1.77 cSt at 15° C. as measured with Brookfield viscometer. Dynamic surface tension $1\times10^{-1}$ seconds after the formation of a new surface was 48 dyne/cm. The emulsification ratio of pure water in ink was 19% as measured by the mortar method. The ink used was S type magenta ink of ink new PROAS G for sheet offset printing (manufactured by Dainippon Ink & Chemicals Inc.). The emulsification ratio of Solution A of the present invention in the ink was 24%. A printing test was carried out by using offset printing press (Mitsubishi Dia half-kiku size press manufactured by Mitsubishi Heavy Industries, Ltd.) equipped with a continuous dampening system. Roller stripping was not caused, water/ink balance was wide and prints were obtained which were excellent in tone reproducibility.

For the purpose of comparison, the following Comparative solution B was prepared by removing the surfactant from the Solution A of the present invention.

| Comparative solution B | Parts by weight |
|---|---|
| Pure water | 100.0 |
| Carboxymethyl cellulose (Cellogen 5A, a product of Dai-ichi Kogyo Seiyaku Co., Ltd.) | 0.015 |
| Octylene glycol | 0.85 |

The viscosity (15° C.) and dynamic surface tension of the Comparative solution B were about the same as those of the solution A. However, the emulsification ratio thereof in ink was 19% which was on the same level with that of pure water. Printing was conducted under the same conditions as those described above by using the comparative solution B. Roller stripping was caused and stable printing was not conducted. The water/ink balance was narrow and the dampening arrangement had to be adjusted many times.

Accordingly, it is clear that the solution A of the present invention is superior to Comparative solution B and the emulsifiability in ink is an important factor.

EXAMPLE 2

| Solution C of the present invention | Parts by weight |
|---|---|
| Pure water | 100.0 |
| Carboxymethyl cellulose (Cellogen BS, a product of Dai-ichi Kogyo Seiyaku Co., Ltd.) | 0.02 |
| Magnesium nitrate ($6H_2O$) | 0.03 |
| Sodium nitrate | 0.01 |
| Phosporic acid (85%) | 0.08 |
| Adduct of 1 to 5 mol of ethylene oxide to 2-ethyl-1,3-hexanediol | 0.75 |
| Propylene glycol | 0.25 |
| Antiseptic (Poroxel CRL, a product of ICI Japan KK) | 0.03 |
| Anti-foaming agent (KS 607, silicone-modified type, a product of Shinetsu Kagaku Kogyo KK) | 0.0003 |
| Surfactant (sorbitan sesquioleate) | 0.01 |

The following solutions were prepared to examine the effect of the present invention.

A Comparative test solution D was prepared by removing the surfactant from the solution C of the present invention. Comparative test solution F was prepared by removing the dynamic surface tension depressant from the solution C. Comparative test solution G was prepared by removing the thickener carboxymethyl cellulose (CMC) from the solution C of the present invention. Furthermore, a dampening solution E containing 8% of IPI and pure water H were prepared.

| Dampening solution E containing 8% of IPA | |
|---|---|
| IPA | 8.0% |
| Pure water | 92.0% |

The liquid physical properties and printing performance of these solutions are shown in Table 1.

Ink used was CAPS-GS type cyan ink and printing plate was used by making PS plate FPS-3 manufactured by Fuji Photo Film Co., Ltd. Printing test was carried out by using offset printing press Harris Aurelia 125 equipped with continuous dampening system. The emulsification ratio was determined by placing 10 g of ink in a mortar, adding the a dampening solution to be tested in an amount of 0.5 g for every time and vigorously stirring them with a pestle to incorporate the solution in ink.

It is clear from Table 1 that the comparative test solution D has a low emulsification ratio in ink and hence the printing performance thereof is insufficient. In the comparative test solution F, static surface tension is lowered by the surfactant, but dynamic surface tension is not lowered and hence tinting (scumming) during printing is severe and it can not be used. In the comparative test solution G, the dynamic surface tension and the emulsification ratio in ink are satisfactory values, but viscosity is low and hence tinting (scumming) is severe and it can not be used. On the other hand, the dampening solution C of the present invention has liquid physical properties substantially equal to those of the dampening solution E containing 8% of IPA, and has satisfactory printing performance. The emulsification ratio thereof in ink is 26% which is higher by 8% than that of pure water. Accordingly, it is clear that the dampening solution C of the present invention is superior to other solutions and it has been confirmed that the three factors of dynamic surface tension, viscosity and emulsification ratio in ink are essential to the substitute for IPA-containing dampening solution.

EXAMPLE 3

| | Parts by weight |
|---|---|
| Pure water | 70 |
| Copolymer (vinylmethyl ether and maleic acid anhydride) (Trade name: GANTREZ S-95) | 1.0 |
| Adduct of 3 to 5 mol of ethyleneoxide to 2-ethyl-1,3-hexanidiol | 18 |
| Ethylene oxide and propyleneoxide block copolymer (Trade name: PLURONIC P-85, a product of Asahi Denka Kogyo K.K.) | 0.5 |
| Magnesium nitrate | 1.5 |
| Phosphoric acid (85%) | 0.6 |
| Preservative (Trade name: DELTOP, a product of Takeda Chemical Industries, Ltd.) | 0.2 |
| Anti-foaming agent (emulsion type silicone anti-foaming agent) | 0.1 |

A concentrated dampening solution having the above composition was prepared and diluted 40 times to obtain a dampening Solution (I). The viscosity of the dampening solution was 1.47 cSt at 15° C. Dynamic surface tension $1\times10^{-1}$ seconds after the formation of a new surface was 46 dyne/cm. The emulsification ration of Solution (I) was 24% using an ink which was sheet-fed offset printing ink, MARK-V NEW produced by Toyo Ink Manufacturing Co., Ltd. The emulsification ratio of pure water in the ink was 19%.

For the purpose of comparison, Comparative Solution (J) was prepared by removing the surfactant PLURONIC P-85 (ethyleneoxide and propyleneoxide block copolymer). The viscosity (at 15° C.) and dynamic surface tension of the Comparative Solution (J) were about the same as those of Solution (I) of the present invention. However, the emulsification ratio in ink was 19% which was on the same level with that of pure water.

Printing was conducted using the above two Solutions (I) and (J). The printing machine used was an offset printing KOMORI LITHRONE 40 equipped with a dampening apparatus Komori matic of plate-feed type dampening system.

TABLE 1

| | Dampening soln. of invention (C) | Comp. test soln. (D) | IPA 8% soln. (E) | Comp. test soln. (F) | Comp. test soln. (G) | Pure water (H) |
|---|---|---|---|---|---|---|
| Emusification ratio in ink | 26% | 18% | 25% | 26% | 26% | 18% |
| Dynamic surface tension (after $10^{-1}$ sec) 15° C. dyne/cm | 44 | 44 | 44 | 72 | 44 | 72 |
| Static surface tension dyne/cm | 44 | 44 | 44 | 44 | 44 | 72 |
| Viscosity (cSt) 15° C. | 1.8 | 1.8 | 1.8 | 1.8 | 1.0 | 1.0 |
| Printing performance | | | | | | |
| 1. Tinting of metering roller | A | B | A | C | C | C |
| 2. Coloring of dampening soln. | A | B | A | C | C | C |
| 3. Tinting of blanket | A | B | A | C | C | C |
| 4. Roller stripping | A | C | A | — | — | — |
| 5. Fill-in of dot part | A | B | A | C | C | C |
| 6. Tone reproducibility | A | B | A | C | C | C |
| 7. Latitude in adjustment amount of dampening solution in dampening system | 3.0 | 0.5 | 3.0 | 0 | 0 | 0 |
| 8. Print finish | A | B | A | C | C | C |

A, B, C in Table 1: A represent "good, practicable", B "poor, impracticable", and C "bad, impracticable".

In the Comparative Solution (J), a metering roller was highly stained and a fill-in of the dots of printed image was generated.

On the other hand, in the Solution (I) of the present invention, excellent prints were obtained stably. The water/ink balance was also splendid.

From the above results, it is apparent that the dampening Solution (I) of the present invention is superior to the Comparative Solution (J), and it has been confirmed that emulsifiability is very important for printing.

EXAMPLE 4

| | Parts by weight |
|---|---|
| Pure water | 70.0 |
| Cellulose derivative modified by glyoxal (methoxyl group (28 to 30%)/hydropropyl group (7 to 12%)) | 0.3 |
| Monoethanol amine | 0.2 |
| Phosphoric acid | 0.3 |
| Zinc nitrate | 0.2 |
| Polyglycol P-400 (Polypropyleneglycol, average molecular weight 400, produced by Dow Chemical Co.) | 20 |
| Dipropyleneglycol monomethyl ether | 10 |

A concentrated dampening solution having the above composition was prepared and diluted 50 times to obtain a dampening Solution (K) of the present invention. The viscosity of the Solution (K) was 1.43 cSt at 15° C. Dynamic surface tension $1\times10^{-1}$ seconds after the formation of a new surface was 48 dyne/cm. The emulsification ratio of Solution (K) was 24% using an ink which was offset printing ink Graf-G produced by Dainippon Ink & Chemicals Inc. The emulsification ratio of pure water in the ink was 20%. It shows that (K) of the present invention has an improved emulsifiability in ink as compared with pure water.

For comparison, the following Comparative Solution (L) was prepared as a dampening comparative solution, according to a prescription for printing using printing plate (published by Japanese Society of Printing Science and Technology).

| | |
|---|---|
| Magnesium nitrate | 113 g |
| Phosphoric acid (85%) | 37 cc |
| Water | to make 3785 cc |

The above etching solution (50 cc) was diluted with water to make 3785 cc of solution and 30 cc of gum arabi emulsion (14° Be') was further added, followed by an addition of isopropyl alcohol to make 8% solution. The solution thus obtained was designated as Comparative Solution (L).

The viscosity of the Comparative Solution (L) was 1.45 cSt at 15° C. Dynamic surface tension $1\times10^{-1}$ seconds after the formation of a new surface was 47 dyne/cm. The emulsification ratio of the Comparative Solution (L) was 24%, as a result of a measurement according to the same way as that for Solution (K) of the present invention.

Printing was carried out using the two dampening Solutions thus obtained, in the same printing conditions as in Example 1. Both Solutions (K) and (L) provided excellent prints stably. Ink-stain on a metering roller of printing machine was little generated and roller-striping was not generated in the cases of both Solutions. Continuous printing was carried out stably with the cases using both Solutions.

From the results of the Experimentation, it is apparent that a requirement to obtain a substitute for IPA-containing dampening solution is satisfied with a dampening solution which has closer characteristic to IPA with three factors of dynamic surface tension, viscosity and emulsifiability in ink, which are liquid physical properties required for dampening solution.

EXAMPLE 5

A dampening Solution (M) was prepared by an addition of 0.05 parts by weight of nonionic surfactant, polyoxyethylene sorbitan mono-oleate (Trade name: Nikkol, produced by Nikko Chemicals K.K.) and 0.01 parts by weight of defoaming agent to the Comparative Solution B used in Example 1. The viscosity and dynamic surface tension of the Solution (M) of the present invention were about the same as those of the Comparative Solution (B). However, the emulsification ratio of the Solution (M) in the same ink used in Example 1 was 23%.

Printing was carried out in the same printing conditions as in Example 1, with the Solution (M) of the present invention and Comparative Solution (B). The comparative Solution (B) has problems in stain on metering roller, fill-in of the dots of printed image and latitude in adjusting liquid-quantity in dampening apparatus to be impractical. On the other hand, the Solution (M) of the present invention has no problem in such a matter and is able to be applied to keep a continuous and stable printing.

While the present invention has been described in detail and with reference to specific embodiments thereof, it is apparent to one skilled in the art that various changes and modifications can be made therein without departing form the spirit and the scope of the present invention.

What is claimed is:

1. In a process for lithographic printing wherein a lithographic printing plate having ink-receptive oleophilic images and hydrophilic non-image areas of the printing surface of the plate is contacted with a lithographic ink and an aqueous dampening solution during printing, wherein the improvement comprises:

using as the aqueous dampening solution a dampening solution having the following properties;

(i) a dynamic surface tension ranging from 25 to 50 dyne/cm at 15° C. at most $1\times10^{-1}$ seconds after a surface of said solution is formed on the surface of a printing plate;

(ii) a viscosity ranging from 1.05 to 5.0 cst at 15° C.; and (iii) an emulsification ratio when said solution is mixed with ink 2 to 30% higher than that of pure water mixed with ink.

2. A process for lithographic printing according to claim 1 wherein the dampening solution contains water, a thickening agent, a water-soluble organic solvent and a surfactant.

3. A process for lithographic printing according to claim 2, wherein said water-soluble organic solvent is selected from alcohols, polyhydric alcohols, ethers esters, polyglycols and mixtures thereof.

4. A process for lithographic printing according to claim 2, wherein said organic solvent has a solubility of 0.5 to 80% by weight in water at 20° C.

5. A process for lithographic printing according to claim 4, wherein said organic solvent has a solubility of 0.5 to 10% by weight at 20° C.

6. A process for lithographic printing according to claim 2, wherein said dampening solution contains from 0.5 to 15% by weight of water-soluble organic solvent.

7. A process for lithographic printing according to claim 2, wherein said dampening solution contains from 0.005 to 10% by weight of thickening agent.

8. A process for lithographic printing according to claim 2, wherein said dampening solution contains not more than 10% by weight of surfactant.

9. A process for lithographic printing according to claim 8, wherein said dampening solution contains from 0.01 to 3% by weight surfactant.

10. A process for lithographic printing according to claim 2, said dampening solution further comprising a wetting agent in an amount not greater than 2.0% by weight.

11. A process for lithographic printing according to claim 1, wherein said dampening solution when mixed with ink has an emulsification ratio 3 to 20% higher than that of pure water mixed with ink.

12. A process for lithographic printing according to claim 1, said dampening solution having a pH ranging from 3 to 6.

13. A process for lithographic printing according to claim 1, said dampening solution having a pH ranging from 7 to 11.

* * * * *

UNITED STATES PATENT AND TRADEMARK OFFICE

CERTIFICATE OF CORRECTION

PATENT NO. : 5,163,999

DATED : November 17, 1992

INVENTOR(S) : Toshio UCHIDA et al

It is certified that error appears in the above-identified patent and that said Letters Patent is hereby corrected as shown below:

On the title page:

In Section [30], kindly delete "May 9, 1989" and insert -- September 5, 1989 --.

Signed and Sealed this

Fifth Day of October, 1993

Attest:

BRUCE LEHMAN

*Attesting Officer* *Commissioner of Patents and Trademarks*